No. 44,228.
H. E. SMITH.
FIREPLACE.
PATENTED SEPT. 13, 1864.
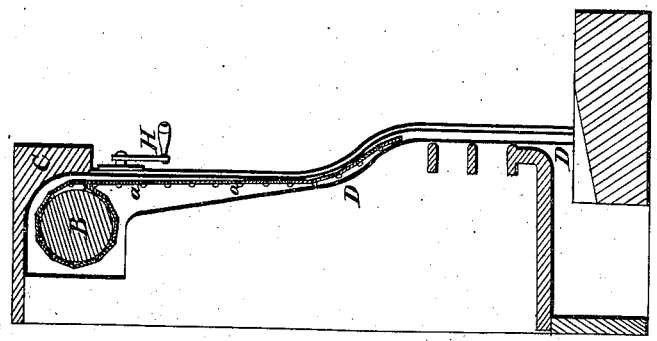
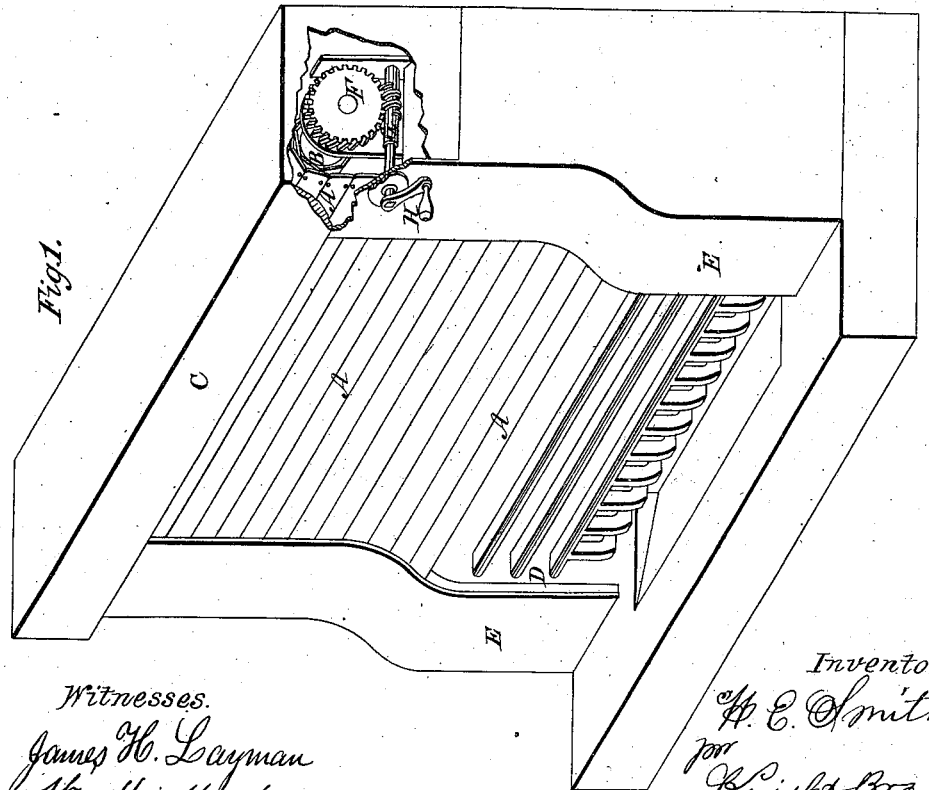
Witnesses.
James H. Layman
H. H. Mackoy.
Inventor.
H. E. Smith
per
Knight Bros
atty.

UNITED STATES PATENT OFFICE.

HAMILTON E. SMITH, OF CINCINNATI, OHIO.

IMPROVEMENT IN FIRE-PLACES.

Specification forming part of Letters Patent No. 44,228, dated September 13, 1864.

*To all whom it may concern:*

Be it known that I, HAMILTON E. SMITH, of Cincinnati, Hamilton county, Ohio, have invented a new and useful Improvement in Fire-Places; and I do hereby declare the following to be a full, clear, and exact description thereof, reference being had to the accompanying drawings, making part of this specification.

My improvement relates to a form of blower attachment to a fire-place, capable of being adjusted so as to close the mouth of the fire-place to a greater or less extent, or to be compactly wound upon a drum or shaft in the chimney-breast.

Figure 1 is a perspective view of a fire place provided with my improvement. Fig. 2 is a longitudinal section of the same.

My blower is composed of a number of thin metallic slats, A, which slats are connected together at their longer edges by means of hinges a.

The upper edge of my blower A a is attached to a shaft or drum, B, which is journaled in a horizontal position within the chimney-breast or mantel C. The lower portion of the blower A a is confined in guiding-grooves D in the sides of the jambs E. The shaft B is driven from the outside through the medium of worm-gearing F G and winch H, or any equivalent means.

The above construction of screen or blower gives it such flexibility as enables it to follow any curved or winding form of jamb, such as that represented. The flexible feature also enables it to be wound up into such compact dimensions as to be entirely invisible when not in use, although available at a moment's notice for closing a part or all of the fire-place opening. It is thus available as a screen to neatly close in the fire-place during the summer. The slats A may be either of cast or wrought iron. When of the latter material, their hinge ears may be formed by cutting and bending the material of the slat itself. Whether of wrought or cast iron, the slats may be stiffened longitudinally by means of beads or corrugations.

I claim herein as new and of my invention—

The combination of the flexible screen or blower A a, drum B, pinion F, worm G, and crank H, all arranged to operate as shown and described.

In testimony of which invention I hereunto set my hand.

HAMILTON E. SMITH.

Witnesses:
GEO. H. KNIGHT,
JAMES H. LAYMAN.